United States Patent
Lee et al.

(10) Patent No.: US 12,260,680 B1
(45) Date of Patent: Mar. 25, 2025

(54) DEVICE AND METHOD FOR DETERMINING COUNTERFEIT FINGERPRINTS AND RECORDING MEDIUM INCLUDING COMMAND FOR PERFORMING METHOD OF TRAINING NEURAL NETWORK TO DETERMINE COUNTERFEIT FINGERPRINTS

(71) Applicant: Suprema Inc., Seongnam-si (KR)

(72) Inventors: Jong Man Lee, Seongnam-si (KR); Young Mook Kang, Seongnam-si (KR); Jae Hyun Park, Seongnam-si (KR); Hochul Shin, Seongnam-si (KR); Bong Seop Song, Seongnam-si (KR)

(73) Assignee: SUPREMA INC., Seongnam-si (KR)

( * ) Notice: Subject to any disclaimer, the term of this patent is extended or adjusted under 35 U.S.C. 154(b) by 0 days.

(21) Appl. No.: 18/521,644

(22) Filed: Nov. 28, 2023

(30) Foreign Application Priority Data

Oct. 25, 2023 (KR) ........................ 10-2023-0143951

(51) Int. Cl.
| | |
|---|---|
| *G06V 40/40* | (2022.01) |
| *G06F 21/32* | (2013.01) |
| *G06V 10/60* | (2022.01) |
| *G06V 10/774* | (2022.01) |
| *G06V 10/82* | (2022.01) |
| *G06V 40/12* | (2022.01) |
| *G06V 40/13* | (2022.01) |

(52) U.S. Cl.
CPC .............. *G06V 40/40* (2022.01); *G06F 21/32* (2013.01); *G06V 10/60* (2022.01); *G06V 10/774* (2022.01); *G06V 10/82* (2022.01); *G06V 40/1318* (2022.01); *G06V 40/1347* (2022.01); *G06V 40/1365* (2022.01)

(58) Field of Classification Search
CPC ...... G06V 40/40; G06V 10/60; G06V 10/774; G06V 10/82; G06V 40/1318; G06V 40/1347; G06V 40/1365; G06F 21/32
See application file for complete search history.

(56) References Cited

U.S. PATENT DOCUMENTS

| | | | |
|---|---|---|---|
| 2018/0225494 A1* | 8/2018 | Rhee .................. | G06V 40/1365 |
| 2020/0202106 A1* | 6/2020 | Kim .................. | G06V 40/1318 |
| 2023/0252283 A1* | 8/2023 | Lee ..................... | G06N 3/0464 |
| | | | 706/25 |

\* cited by examiner

*Primary Examiner* — Premal R Patel
(74) *Attorney, Agent, or Firm* — Bridgeway IP Law Group, PLLC; Jihun Kim

(57) ABSTRACT

A method of determining a counterfeit fingerprint by a system for determining a counterfeit fingerprint that includes an internal light source and an external light source, comprising: extracting a first fingerprint area of a first fingerprint image obtained from a light signal of the internal light source when a target object's fingerprint comes in contact with a fingerprint contact surface of the system for determining a counterfeit fingerprint; extracting a second fingerprint area of a second fingerprint image obtained from a light signal of the external light source based on the first fingerprint area; and inputting the first fingerprint area and the second fingerprint area into a pre-trained neural network of the system for determining a counterfeit fingerprint to output a result of determining whether the fingerprint is counterfeit.

14 Claims, 9 Drawing Sheets

DEVICE AND METHOD FOR DETERMINING COUNTERFEIT FINGERPRINTS AND RECORDING MEDIUM INCLUDING COMMAND FOR PERFORMING METHOD OF TRAINING NEURAL NETWORK TO DETERMINE COUNTERFEIT FINGERPRINTS

CROSS-REFERENCE TO RELATED APPLICATIONS

This application claims priority from Korean Patent Application No. 10-2023-0143951, filed on Oct. 25, 2023, in the Korean Intellectual Property Office, which is incorporated herein by reference in its entirety.

TECHNICAL FIELD

The present disclosure relates to technology for recognizing fingerprints to determine fake fingerprints and training artificial intelligence for the same.

This work was supported by the Korea Advanced Institute of Science & Technology (KAIST) grant funded by the Ministry of Science and ICT to develop innovative convergence technology of communication and computing for superintelligence services (Project unique No.: 1711120097, Project period: 2023.01.01~ 2023.12.31).

BACKGROUND

Fingerprint recognition is one of the most widely used biometric technologies in modern times, and is rapidly replacing passwords made up of letters or patterns in real life. Many people use the technology for fingerprint recognition, believing that it is a technology that is more difficult to leak or copy than letters or patterns, but fingerprints are also not free from being copied. In other words, when a real fingerprint is exposed to others, it can be copied, and authentication also can be done using the copied counterfeit fingerprint. That is, fingerprints are left on every object you touch, so they can be easily exposed to others.

To prevent the risk of fingerprints being copied, technology to distinguish between real and counterfeit fingerprints (e.g., technology to determine counterfeit fingerprints based on artificial intelligence) has been actively developed, but verification is still incomplete for fake fingerprints made of materials that are easily available around us (e.g., latex, wood glue, etc.).

SUMMARY

The present disclosure is aimed at providing technology for providing more accurate results of determining whether an input fingerprint is fake by training artificial intelligence to determine counterfeit fingerprints.

The present disclosure is aimed at providing technology for increasing the accuracy of determining the state of fingerprints by obtaining a fingerprint image using light sources placed internally and externally and training artificial intelligence to determine whether the fingerprint image is forged.

In accordance with a first aspect of the present disclosure, there is provided a device for determining a counterfeit fingerprint of a system for determining a counterfeit fingerprint that includes an internal light source and an external light source, comprising: an input unit to which a first fingerprint image obtained from a light signal of the internal light source and a second fingerprint image obtained from the external light source are input when a target object's fingerprint comes in contact with a fingerprint contact surface of the system for determining a counterfeit fingerprint; a storage unit including a command for outputting a result of determining whether the fingerprint is forged using a pre-trained neural network; and a processing unit that extracts a first fingerprint area based on the first fingerprint image and a second fingerprint area of the second fingerprint image based on the first fingerprint area and inputs the first fingerprint area and the second fingerprint area into the neural network by executing the command to allow a result of determining whether the fingerprint is forged to be output.

The neural network is a pre-trained neural network that uses the first fingerprint area and the second fingerprint area as data for training and uses information on the characteristics of the fingerprint as label data to output a result of determining whether the fingerprint is forged.

The processing unit includes: an extraction unit that divides the first fingerprint image into a plurality of areas based on a light signal reflected from the internal light source to extract the first fingerprint area and extracts the second fingerprint area within the first fingerprint area from a light signal transmitted from the external light source; a measurement unit that measures the range of brightness values of the first fingerprint area or the second fingerprint area; and a determination unit that classifies the fingerprint as at least one of a normal fingerprint, a wet fingerprint, and a dry fingerprint based on the range of the brightness values.

The extraction unit extracts the second fingerprint area based on the distance between the external light source and the fingerprint contact surface.

The determination unit classifies the fingerprint as the normal fingerprint when the brightness value is within a threshold range, classifies the fingerprint as the wet fingerprint when the brightness value falls outside the threshold range, and classifies the fingerprint as the dry fingerprint when the brightness value falls below the threshold range.

The determination unit classifies the fingerprint as at least one of the normal fingerprint, the wet fingerprint, and the dry fingerprint based on a result of measuring the range of the brightness values of the first fingerprint area in the plurality of areas.

The determination unit determines whether there was a change in brightness in the second fingerprint area, classifies the fingerprint as at least one of the normal fingerprint, the wet fingerprint, and the dry fingerprint based on the result of measuring the range of the brightness values of the first fingerprint area in the plurality of areas when there was no change in brightness, and classifies the fingerprint as at least one of the normal fingerprint, the wet fingerprint, and the dry fingerprint based on the results of measuring the range of the brightness values of the first fingerprint area and the second fingerprint area in effective areas where there was a change in brightness when there was a change in brightness.

In accordance with a second aspect of the present disclosure, there is provided a method of determining a counterfeit fingerprint by a system for determining a counterfeit fingerprint that includes an internal light source and an external light source, comprising: extracting a first fingerprint area of a first fingerprint image obtained from a light signal of the internal light source when a target object's fingerprint comes in contact with a fingerprint contact surface of the system for determining a counterfeit fingerprint; extracting a second fingerprint area of a second fingerprint image obtained from a light signal of the external light source based on the first fingerprint area; and inputting the first fingerprint area and the second fingerprint area into a pre-trained neural network of the system for determining a counterfeit fingerprint to output a result of determining whether the fingerprint is counterfeit.

The neural network is a pre-trained neural network that uses the first fingerprint area and the second fingerprint area as data for training and uses information about the characteristics of the fingerprint as label data to output a result of determining whether the fingerprint is forged.

The extracting of the first fingerprint area involves extracting the first fingerprint area by dividing the first fingerprint image into a plurality of areas based on a light signal reflected from the internal light source.

The extracting of the second fingerprint area involves extracting the second fingerprint area within the first fingerprint area from a light signal transmitted from the external light source.

The method further comprising classifying the fingerprint as at least one of a normal fingerprint, a wet fingerprint, and a dry fingerprint based on the range of brightness values of the first fingerprint area or the second fingerprint area.

The classifying of the fingerprint involves classifying the fingerprint as the dry fingerprint when the brightness value falls below a threshold range, classifying the fingerprint as the wet fingerprint when the brightness value falls outside the threshold range, and classifying the fingerprint as the normal fingerprint when the brightness value is within the threshold range.

The neural network is a pre-trained neural network that uses the first fingerprint area and the second fingerprint area as data for training and uses information on the characteristics of at least one of the normal fingerprint, the wet fingerprint, and the dry fingerprint as label data to output a result of determining whether the fingerprint is forged.

In accordance with a third aspect of the present disclosure, there is provided a computer-readable recording medium having a stored computer program, wherein the computer program includes a command for enabling a processor to perform a method of training a neural network for determining a fake fingerprint of a system for determining a counterfeit fingerprint that includes an internal light source and an external light source, and the method involves: extracting a first fingerprint area of a first fingerprint image obtained from a light signal of the internal light source when a target object's fingerprint comes in contact with a fingerprint contact surface of the system for determining a counterfeit fingerprint; extracting a second fingerprint area of a second fingerprint image obtained from a light signal of the external light source based on the first fingerprint area; and training the neural network to output a result of determining whether the fingerprint is forged by using the first fingerprint area and the second fingerprint area as data for training and using information about the characteristics of the fingerprint as label data.

The extracting of the first fingerprint area involves extracting the first fingerprint area by dividing the first fingerprint image into a plurality of areas based on a light signal reflected from the internal light source.

The extracting of the second fingerprint area involves extracting the second fingerprint area within the first fingerprint area from a light signal transmitted from the external light source.

The extracting of the second fingerprint area further involves extracting the second fingerprint area based on the distance between the external light source and the fingerprint contact surface.

The method further comprising classifying the fingerprint as at least one of a normal fingerprint, a wet fingerprint, and a dry fingerprint based on the range of brightness values of the first fingerprint area or the second fingerprint area.

The training involves training the neural network to output a result of determining whether the fingerprint is forged by using the first fingerprint area and the second fingerprint area as data for training and using information about the characteristics of at least one of the normal fingerprint, the wet fingerprint, and the dry fingerprint as label data.

In accordance with a fourth aspect of the present disclosure, there is provided a method of training a neural network for determining a fake fingerprint of a system for determining a counterfeit fingerprint that includes internal and external light sources, including extracting a first fingerprint area of a first fingerprint image obtained from a light signal of the internal light source when a target object's fingerprint comes in contact with a fingerprint contact surface of the system for determining a counterfeit fingerprint; extracting a second fingerprint area of a second fingerprint image obtained from a light signal of the external light source based on the first fingerprint area; and training the neural network to output a result of determining whether the fingerprint is forged by using the first fingerprint area and the second fingerprint area as data for training and using information about the characteristics of the fingerprint as label data.

Here, the method may involve classifying the fingerprint as the dry fingerprint when the brightness value of the first fingerprint area or the second fingerprint area falls below a threshold range, classifying the fingerprint as the wet fingerprint when the brightness value falls outside the threshold range, and classifying the fingerprint as the normal fingerprint when the brightness value is within the threshold range.

The classifying may involve classifying the fingerprint as at least one of the normal fingerprint, the wet fingerprint, and the dry fingerprint based on a result of measuring the range of the brightness values of the first fingerprint area in a plurality of areas.

In addition, the classifying may involve determining whether there was a change in brightness in the second fingerprint area, classifying the fingerprint as at least one of the normal fingerprint, the wet fingerprint, and the dry fingerprint based on the result of measuring the range of the brightness values of the first fingerprint area in the plurality of areas when there was no change in brightness, and classifying the fingerprint as at least one of the normal fingerprint, the wet fingerprint, and the dry fingerprint based on the results of measuring the range of the brightness values of the first fingerprint area and the second fingerprint area in effective areas where there was a change in brightness when there was a change in brightness.

The information about the characteristics may include information about the characteristics of an image of a real fingerprint or information about the characteristics of an image of a fake fingerprint.

The information about the characteristics of an image of a real fingerprint may include at least one of information about the characteristics of an image of a normal fingerprint, information about the characteristics of an image of a wet fingerprint, and information about the characteristics of an image of a dry fingerprint.

The information about the characteristics of an image of a fake fingerprint may include information about the characteristics of an image of a counterfeit fingerprint obtained by using counterfeit samples such as dragon skin, eco flex, wood glue, and body double.

The present disclosure may provide a device for determining a counterfeit fingerprint of a system for determining a counterfeit fingerprint that includes an internal light source and an external light source, including an input unit to which a first fingerprint image obtained from a light signal of the internal light source and a second fingerprint image obtained from the external light source are input when a target object's fingerprint comes in contact with a fingerprint contact surface of the system for determining a counterfeit fingerprint; a storage unit including a command for outputting a result of determining whether the fingerprint is forged using a pre-trained neural network; and a processing unit that extracts a first fingerprint area based on the first fingerprint image and a second fingerprint area of the second fingerprint image based on the first fingerprint area and inputs the first fingerprint area and the second fingerprint area into the neural network by executing the command to allow a result of determining whether the fingerprint is forged to be output.

Here, the internal light source may radiate a light signal to the fingerprint contact surface so that the light signal reflected from the fingerprint contact surface may be input to an image sensor of the system for determining a counterfeit fingerprint, and the external light source may be disposed on at least one side of the fingerprint contact surface and radiate a light signal to the fingerprint contact surface so that the light signal transmitted through the object whose fingerprint is input may be input to the image sensor.

According to the embodiments of the present disclosure, to provide a result of determining whether a fingerprint is forged, based on a fingerprint image obtained from the internal light source, the area of a fingerprint image obtained from the external light source may be extracted, and artificial intelligence may be trained about the extracted area. As a result, the accuracy in recognizing fingerprints and the reliability in determining counterfeit fingerprints may be increased. Therefore, according to the present disclosure, it may be possible to secure high security in recognizing counterfeit fingerprints.

DETAILED DESCRIPTION

Hereinafter, the embodiments of the present disclosure will be described in detail with reference to the attached drawings.

In the present disclosure, "including" a certain component means that other components may be further included rather than they are excluded, unless specifically stated to the contrary.

Figure 1:
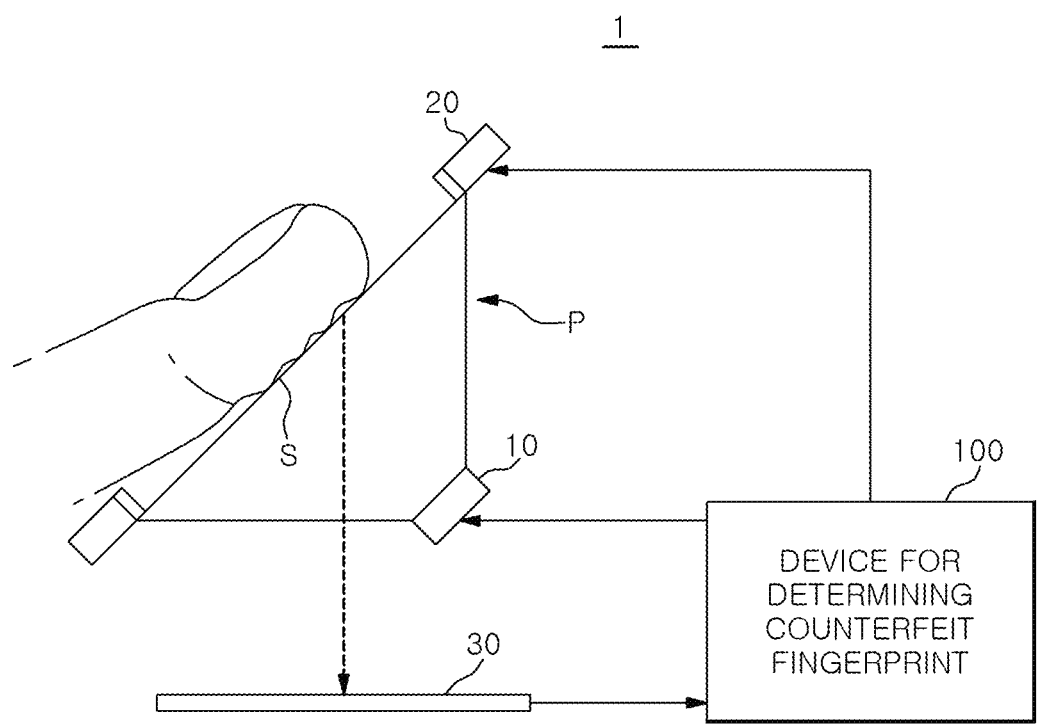
FIG. 1 is a schematic view of a system for determining a counterfeit fingerprint including a device for determining a counterfeit fingerprint according to an embodiment of the present disclosure.

FIG. 1 is a schematic view of a system for determining a counterfeit fingerprint including a device for determining a counterfeit fingerprint according to an embodiment of the present disclosure.

As shown in FIG. 1, a system for determining a counterfeit fingerprint 1 may include a prism P, an internal light source 10, an external light source 20, an image sensor 30, and a device for determining a counterfeit fingerprint 100.

The prism P may have a fingerprint contact surface S in contact with a fingerprint and an emission surface where light (image of fingerprint) reflected or scattered from the fingerprint contact surface S is emitted. As shown in FIG. 1, the prism P may have four sides (trapezoidal) or three sides (triangle) in its cross-sectional shape (or its shape excluding the surfaces not used optically), and, instead of the prism, a light refractor in a broad sense may be used.

For example, when a user touches the fingerprint contact surface S with his or her finger, the prism P may collect the fingerprint of the finger located on the fingerprint contact surface S. First, the part that protrudes from the fingerprint of the finger is called a ridge, and the part that goes inward is called a valley. When the user's fingerprint is input to the prism P, the protruding ridges may come into contact with the fingerprint contact surface S of the prism P, and the valleys may be spaced apart from the fingerprint contact surface S by a predetermined distance compared to the ridges.

The light source of the system for determining a counterfeit fingerprint 1 may radiate light to the fingerprint area of a finger. When the light emitted by the light source is input to the prism P, part of the light may be reflected by the ridges and input to the device for determining a counterfeit fingerprint 100, and part of the light may pass through the valleys and output out of the prism P. Then, the part of the light input by the ridge may pass through an optical lens (not shown) and be input to the image sensor 30 to be sensed in the form of an image of a fingerprint shape.

The transmitted light sensed in that way may be influenced by how closely the ridges of the fingerprint are in contact with the fingerprint contact surface S.

Accordingly, according to an embodiment of the present disclosure, the system for determining a counterfeit fingerprint 1 may have the internal light source 10 and the external light source 20, an image of a fingerprint may be obtained based on the light signals of the internal light source 10 and the external light source 20, and, using the image of the fingerprint of the external light source 20 based on the image of the fingerprint of the internal light source 10, the result of determining whether the fingerprint in contact with the fingerprint contact surface S is counterfeit may be output.

As shown in FIG. 1, the internal light source 10 may be disposed opposite to the fingerprint contact surface S of the prism P, and may radiate a light signal to the fingerprint contact surface S so that the light signal may be reflected from the fingerprint contact surface S and input to the image sensor 30. In addition, the external light source 20 may be disposed on at least one side of the fingerprint contact surface S of the prism P, and may radiate a light signal to the fingerprint contact surface S so that the light signal passing through an object whose fingerprint is input may be input to the image sensor 30. FIG. 1 shows the external light source 20 disposed on both sides of the fingerprint contact surface S, but this is only an example to describe the embodiment. Depending on the environment where the system for determining a counterfeit fingerprint 1 is installed and the structure, the specifications, etc. thereof, the external light source 20 may be placed only on either of the sides of the fingerprint contact surface S.

Meanwhile, the image sensor 30 may obtain an image of a fingerprint in contact with the fingerprint contact surface S by outputting a digital signal, which is an electrical signal corresponding to an incident light signal. The image sensor 30 may be a fingerprint sensor that operates in an optical manner and may use a charge coupled device (CCD), a complementary metal-oxide semiconductor (CMOS) device, etc., and may serve to sense an image of a fingerprint shape generated by the light source. The image sensor 30 according to an embodiment of the present disclosure may generate an image by changing the value of an electrical signal depending on the amount of light. That is, the image sensor 30 may output a black image when there is no light at all and output a white image when there is the greatest amount of incident light.

The device for determining a counterfeit fingerprint 100 according to an embodiment of the present disclosure may obtain an image of a fingerprint from a reflected light signal of the internal light source 10, extract a plurality of first fingerprint areas from the obtained image of the fingerprint, obtain an image of a fingerprint from a light signal transmitted from the external light source 20, extract a second fingerprint area of the image of the fingerprint obtained from the light signal transmitted from the external light source 20 based on the extracted first fingerprint area, and perform artificial intelligence learning on the separately extracted first and second fingerprint areas to output the result of determining whether the fingerprint in contact with the fingerprint contact surface S is counterfeit.

Figure 2:
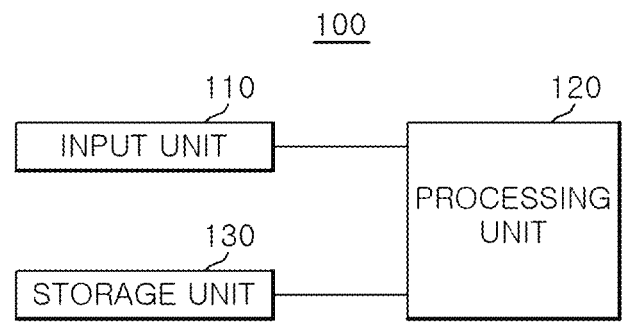
FIG. 2 is a block diagram for illustrating the features of the device for determining a counterfeit fingerprint according to an embodiment of the present disclosure.

FIG. 2 is a block diagram for illustrating the features of the device for determining a counterfeit fingerprint 100.

As shown in FIG. 2, the device for determining a counterfeit fingerprint 100 may include an input unit 110, a processing unit 120, and a storage unit 130.

When a fingerprint of an object whose fingerprint is input (e.g., a real person's finger or a counterfeit sample) comes in contact with the fingerprint contact surface S of the system for determining a counterfeit fingerprint 1, the input unit 110 may input a first fingerprint image obtained from a light signal of the internal light source 10 and a second fingerprint image obtained from a light signal of the external light source 20.

The processing unit 120 may extract a first fingerprint area in which the first fingerprint image input by the input unit 110 is divided into a plurality of areas. For example, the first fingerprint area may have a grid shape (e.g., a 3×3 grid) in which light emitted from the internal light source 10 to the fingerprint contact surface S is divided into a plurality of areas, and each grid area may include a fingerprint area. In addition, the processing unit 120 may extract the second fingerprint area from the light signal transmitted from the external light source 20 in the first fingerprint area, and may train a neural network to output a result of determining whether a fingerprint is counterfeit based on the separately extracted first and second fingerprint areas or control a trained neural network to output a result of determining whether a fingerprint is forged. The processing unit 120 may include a microprocessor-based processing device, for example, and a detailed description of the specific features and functions of the processing unit 120 will be provided below with reference to FIG. 3.

The storage unit 130 may output a result of determining whether a fingerprint is forged or not based on a command of the processing unit 120, or may include a neural network that has been trained to output a result of determining whether a fingerprint is forged. Here, the neural network may include an artificial intelligence neural network based on deep learning, for example, and may be included in a program for allowing the processing unit 120 to determine counterfeit fingerprints. Accordingly, the processing unit 120 may extract the first fingerprint area based on the first fingerprint image of the internal light source 10, extract the second fingerprint area of the second fingerprint image of the external light source 20 based on the first fingerprint area, and input the first fingerprint area and the second fingerprint area into the neural network in the storage unit 130 by executing a command to output a result of determining whether a fingerprint is forged or train a neural network to output a result of determining whether a fingerprint is forged. The storage unit 130 may include a recording medium such as a random-access memory (RAM) or a read only memory (ROM), and the embodiments of the present disclosure do not need to be limited to a specific recording medium.

Figure 3:
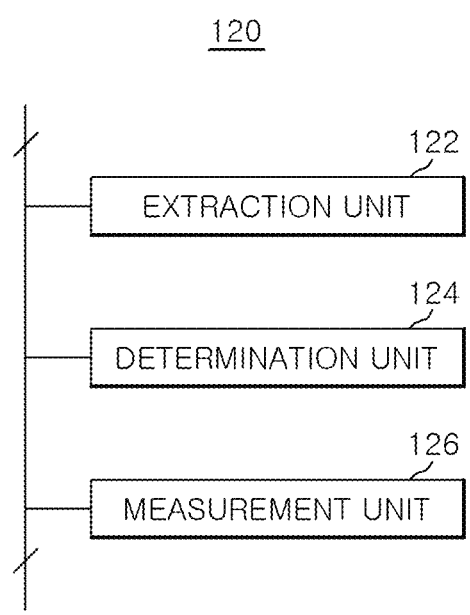
FIG. 3 is a block diagram for illustrating the features of a processing unit of the device for determining a counterfeit fingerprint in FIG. 2.

FIG. 3 is a block diagram for illustrating the features of the processing unit 120 of the device for determining a counterfeit fingerprint 100 in FIG. 2.

As shown in FIG. 3, the processing unit 120 may include an extraction unit 122, a determination unit 124, and a measurement unit 126.

The extraction unit 122 may divide the first fingerprint image into a plurality of areas based on a light signal reflected from the internal light source 10 to extract the first fingerprint area, and may extract the second fingerprint area in the first fingerprint area based on a light signal transmitted from the external light source 20. Here, the extraction unit 122 may extract the second fingerprint area based on the distance between the external light source 20 and the fingerprint contact surface S. For example, when one external light source 20 is placed on the side of the fingerprint contact surface S and the distance between the fingerprint contact surface S and the external light source is d, the second fingerprint area may be differently extracted depending on the value of d.

The determination unit 124 may execute a command of the processing unit 120 based on the first fingerprint area and the second fingerprint area extracted from the second fingerprint image based on the first fingerprint area to input the first fingerprint area and the second fingerprint area into a neural network in the storage unit 130 and output a result of determining whether a fingerprint is forged. In addition, the determination unit 124 may output a result of determining the state of the fingerprint in contact with the fingerprint contact surface S. To do so, the determination unit 124 may use the measurement unit 126, which will be described below.

The measurement unit 126 may measure the range of the brightness values of the first fingerprint area and/or the second fingerprint area. For example, the measurement unit 126 may determine the state of a fingerprint based on the image of the internal light source 10. For drier fingerprints, the value of the ridge area may be closer to the value of the background (area other than the fingerprint), and, for wetter fingerprints, the value may be further away from the value of the background. Therefore, based on such a principle, the measurement unit 126 may measure the range of the brightness values of the fingerprint areas.

More specifically, the system for determining a counterfeit fingerprint 1 may radiate the internal light source 10 and the external light source 20 to the fingerprint contact surface S and obtain reflected or scattered light through the prism P from the image sensor 30. Here, the image of a fingerprint may be greatly affected by how closely the fingerprint is adhered to the surface of the prism P. How closely the fingerprint is adhered to the surface is directly related to the values of factors in the surrounding environment. For example, when the humidity is too low and the fingerprint is dry, the finger will not fully adhere to the surface of the prism, creating a tiny space therebetween. As a result, the amount of scattered light is reduced, or the ridges do not appear clearly and are broken. On the other hand, when the humidity is high and the fingerprint is wet, moisture fills in the valleys between the ridges. Consequently, an excessive amount of light is scattered from the fingerprint, so the ridges are attached to each other in the image. This is a sensitive problem that occurs when obtaining images of fingerprints, and the quality of the images varies even depending on the season. Although only the example of humidity was given above, an image of a fingerprint is also affected by temperature, and, in particular, can be significantly affected by both humidity and temperature. According to an embodiment of the present disclosure, the state of a fingerprint may be determined based on the range of brightness values of a fingerprint area, and the result of determining the state of the fingerprint may be used for training an artificial intelligence. Of course, it may be possible to improve the quality of the fingerprint image by manually adjusting the sensitivity of the image sensor 30 to equalize the quality of the image. In this regard, it should be noted that it may be possible to arbitrarily adjust the values for controlling the image sensor 30 so that gain, contrast, etc. as well as the brightness values of the fingerprint area can be used to determine the state of the fingerprint.

Therefore, the determination unit 124 may classify a fingerprint as at least one of a normal fingerprint, a wet fingerprint, and a dry fingerprint based on the range of brightness values obtained by the measurement unit 126. The processing unit 120 may use the first fingerprint area and the second fingerprint area as data for training, and may train a neural network in the storage unit 130 to output a result of determining whether a fingerprint is forged by using information about the characteristics of at least one of a normal fingerprint, a wet fingerprint, and a dry fingerprint as label data. For example, the determination unit 124 may classify a fingerprint as a normal fingerprint when a brightness value is within a threshold range, and may classify the fingerprint as a wet fingerprint when the brightness value falls outside the threshold range. In addition, when the brightness value falls below the threshold range, the determination unit 124 may classify the fingerprint as a dry fingerprint.

In particular, the determination unit 124 may classify a fingerprint as at least one of a normal fingerprint, a wet fingerprint, and a dry fingerprint based on a result of measuring the range of brightness values of the first fingerprint area in a plurality of areas. Alternatively, the determination unit 124 may determine whether there was a change in brightness in the second fingerprint area. When there was no change in brightness, the determination unit 124 may classify a fingerprint as at least one of a normal fingerprint, a wet fingerprint, and a dry fingerprint based on the result of measuring the range of the brightness values of the first fingerprint area in the plurality of areas. On the other hand, when there was a change in brightness, the determination unit 124 may classify a fingerprint as at least one of a normal fingerprint, a wet fingerprint, and a dry fingerprint based on the results of measuring the range of the brightness values of the first fingerprint area and the second fingerprint area in the effective areas where there is a change in brightness.

Figure 4:
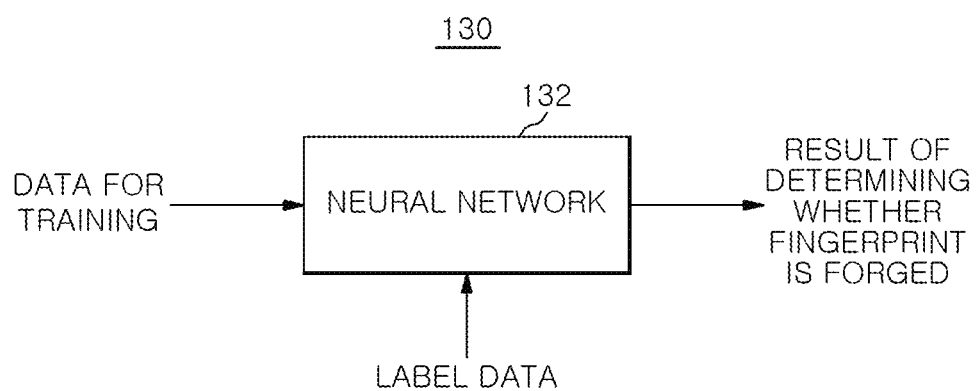
FIG. 4 is a view for illustrating the function of a neural network included in a storage unit of the device for determining a counterfeit fingerprint in FIG. 2, for example, the function of learning to determine whether a fingerprint is forged.

FIG. 4 is a view for illustrating the function of a neural network 132 included in the storage unit 130 of the device for determining a counterfeit fingerprint in FIG. 2, for example, the function of learning to determine whether a fingerprint is forged.

In FIG. 4, the data for training input to the neural network 132 may include the first fingerprint area of the fingerprint image obtained by the internal light source 10 and the second fingerprint area of the fingerprint image obtained by the external light source 20.

The label data input to the neural network 132 may include information about the characteristics of a fingerprint, for example, and the neural network 132 may use the first fingerprint area and the second fingerprint area as the data for training and may be a neural network trained to output a result of determining whether a fingerprint is forged by using the information about the characteristics of the fingerprint as the label data.

The neural network 132 may include a neural network trained based on deep learning, such as a convolutional neural network (CNN) or a recurrent neural network (RNN).

Figure 5:
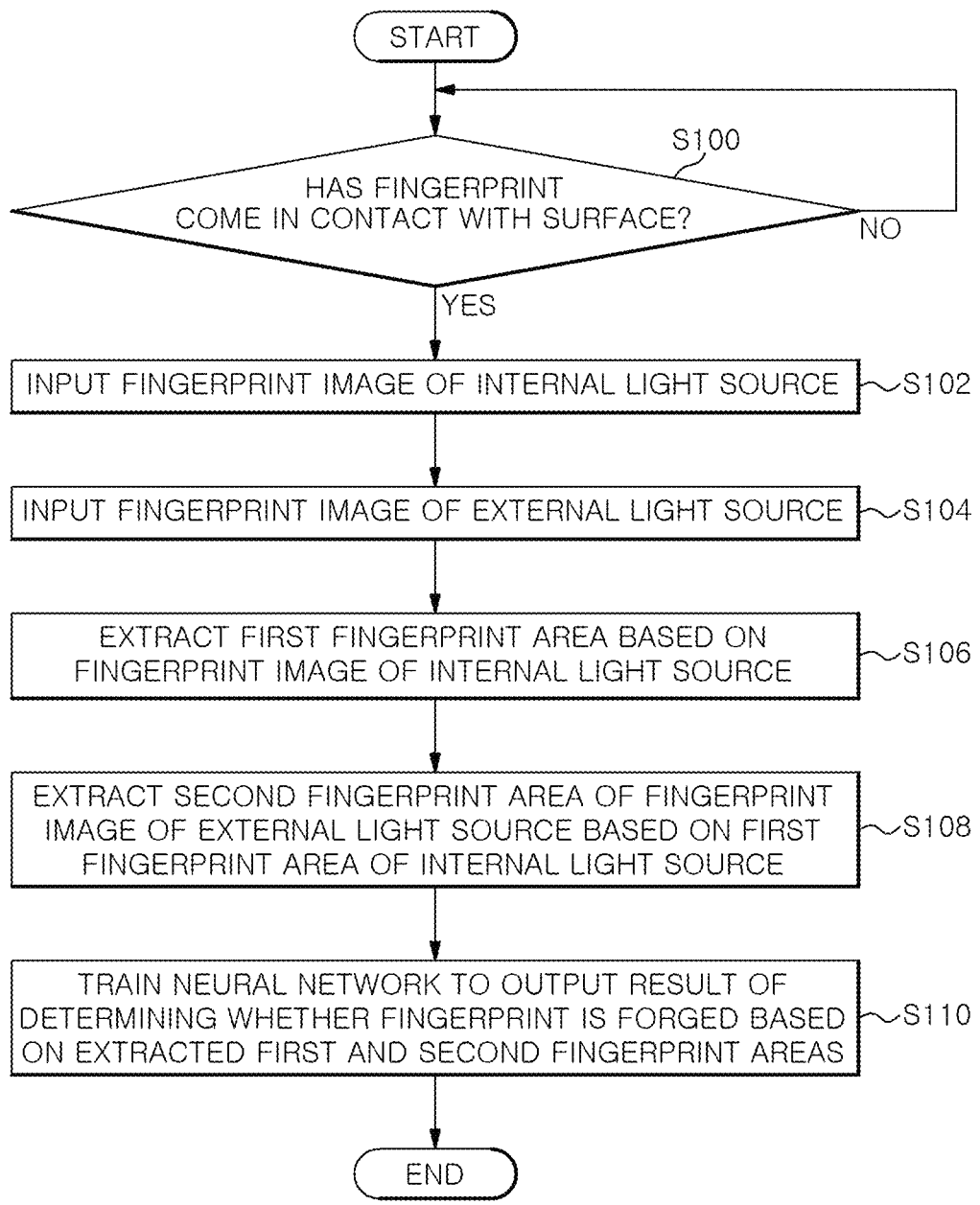
FIG. 5 is a flowchart for illustrating a method of training the neural network for determining a counterfeit fingerprint according to an embodiment of the present disclosure.

FIG. 5 is a flowchart for illustrating a method of training the neural network 132 for determining a counterfeit fingerprint according to an embodiment of the present disclosure.

As shown in FIG. 5, when an object whose fingerprint is input comes in contact with the fingerprint contact surface S at S100, the first fingerprint image obtained from a light signal reflected from the internal light source 10 in the system for determining a counterfeit fingerprint 1 may be input to the device for determining a counterfeit fingerprint 100, and, at the same time, the second fingerprint image obtained from a light signal transmitted from the external light source 20 may be input to the device for determining a counterfeit fingerprint 100 at S102 and S104.

After the first fingerprint image and the second fingerprint image have been input, the processing unit 120 in the device for determining a counterfeit fingerprint 100 may extract the first fingerprint area of the first fingerprint image obtained from the light signal of the internal light source 10 at S106. For example, the processing unit 120 may extract the first fingerprint image in the form of n first fingerprint areas divided into a grid.

Thereafter, the processing unit 120 may extract the second fingerprint area of the second fingerprint image of the external light source 20 based on the extracted first fingerprint area at S108. For example, the processing unit 120 may extract the second fingerprint area of the second fingerprint image included in the grid of the first fingerprint area from the entire area of the second fingerprint image. Here, the second fingerprint area may be extracted differently depending on the distance between the external light source 20 and the fingerprint contact surface S.

Afterwards, the processing unit 120 may train a neural network to output a result of determining whether a fingerprint is forged based on the extracted first and second fingerprint areas at S110.

Figure 6:
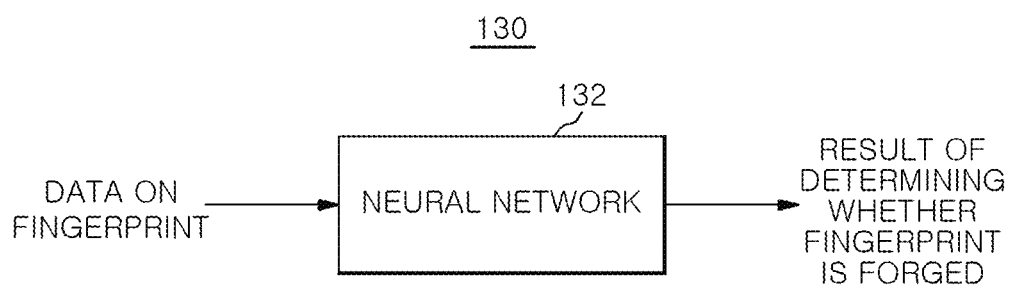
FIG. 6 is a view for illustrating the function of the neural network included in the storage unit of the device for determining a counterfeit fingerprint in FIG. 2, for example, the function of determining a counterfeit fingerprint.

FIG. 6 is a view for illustrating the function of a neural network included in the storage unit 130 of the device for determining a counterfeit fingerprint 100 in FIG. 2, for example, the function of determining a counterfeit fingerprint.

In FIG. 6, the data input to the neural network 132 may include the first fingerprint area of the fingerprint image obtained by the internal light source 10 and the second fingerprint area of the fingerprint image obtained by the external light source 20.

The neural network 132 may be a pre-trained neural network that uses the first fingerprint area and the second fingerprint area as data for training and uses information about the characteristics of a fingerprint as label data to output a result of determining whether the fingerprint is forged.

Accordingly, when the first fingerprint area and the second fingerprint area are input to the neural network 132, the processing unit 120 may output a result of determining whether a fingerprint is forged.

The neural network 132 may include a neural network trained based on deep learning, such as the CNN or the RNN, and does not need to be limited to a specific neural network.

Figure 7:
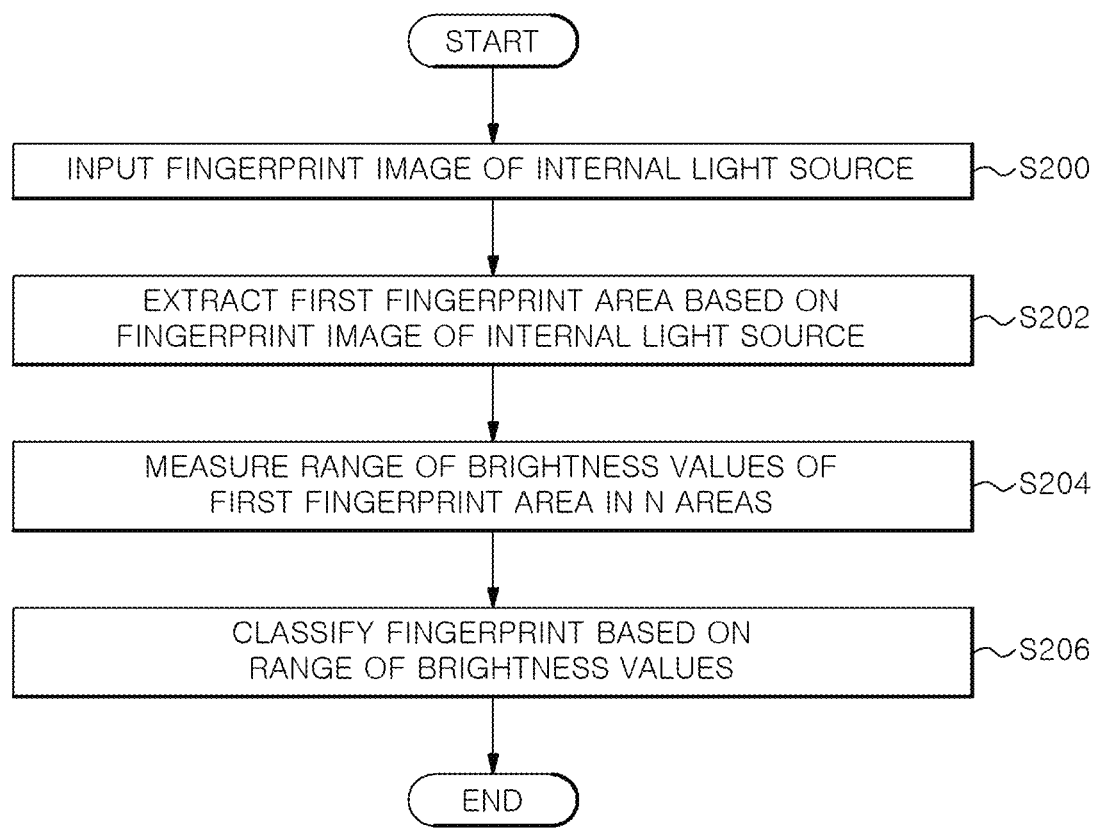
FIG. 7 is a flowchart for illustrating a process of determining the state of a fingerprint in connection with the function of determining a counterfeit fingerprint of the neural network in FIG. 6, for example, a process of determining the state of a fingerprint based on the internal light source.

FIG. 7 is a flowchart for illustrating a process of determining the state of a fingerprint in connection with the function of determining a counterfeit fingerprint of the neural network 132 in FIG. 6, for example, a process of determining the state of a fingerprint based on the internal light source 10.

As shown in FIG. 7, when a fingerprint image of the internal light source 10 is input by the input unit 110 of the device for determining a counterfeit fingerprint 100 at S200, the processing unit 120 of the device for determining a counterfeit fingerprint 100 may extract the first fingerprint area based on the input fingerprint image of the internal light source 10 at S202. For example, the processing unit 120 may extract the first fingerprint area in the form of a 3×3 grid.

Afterwards, the processing unit 120 may measure the range of brightness values of the first fingerprint area in n areas at S204. For example, when the first fingerprint area is in the form of a 3×3 grid, the processing unit 120 may measure the range of brightness values of the first fingerprint area in the nine areas of the grid.

Thereafter, the processing unit 120 may determine the actual state of the fingerprint based on the result of measuring the range of the brightness values of the first fingerprint area at S206. For example, the processing unit 120 may classify the fingerprint as at least one of a normal fingerprint, a wet fingerprint, and a dry fingerprint based on the result of measuring the range of the brightness values of the first fingerprint area in the nine areas of the grid. For example, the processing unit 120 may classify the fingerprint as a dry fingerprint when a brightness value falls below a threshold range, classify the fingerprint as a wet fingerprint when the brightness value falls outside the threshold range, and classify the fingerprint as a normal fingerprint when the brightness value is within the threshold range.

Figure 8:
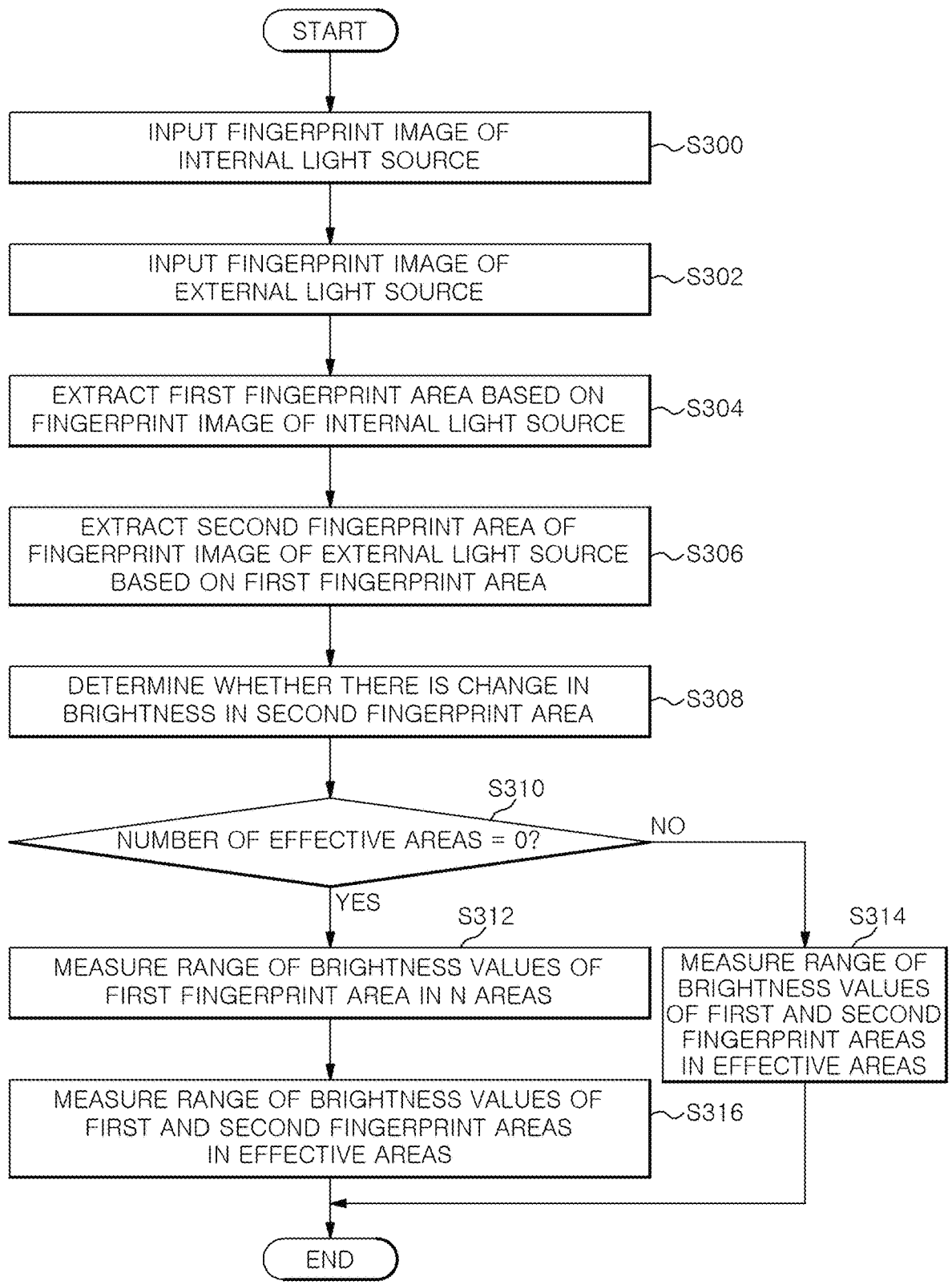
FIG. 8 is a flowchart for illustrating a process of determining the state of a fingerprint in relation to the function of determining a counterfeit fingerprint of the neural network in FIG. 6, for example, a process of determining the state of a fingerprint using the internal light source and the external light source.

FIG. 8 is a flowchart for illustrating a process of determining the state of a fingerprint in relation to the function of determining a counterfeit fingerprint of the neural network in FIG. 6, for example, a process of determining the state of a fingerprint using the internal light source 10 and the external light source 20.

As shown in FIG. 8, the fingerprint image of the internal light source 10 may be input by the input unit 110 of the device for determining a counterfeit fingerprint 100 at S300, and the fingerprint image of the external light source 20 may be input by the input unit 110 at S302.

The processing unit 120 of the device for determining a counterfeit fingerprint 100 may extract the first fingerprint area based on the input fingerprint image of the internal light source 10 at S304. For example, the processing unit 120 may extract nine first fingerprint areas in the form of a 3×3 grid.

After the first fingerprint area has been extracted, the processing unit 120 may extract the second fingerprint area of the fingerprint image of the external light source 20 based on the first fingerprint area at S306. For example, the processing unit 120 may extract the second fingerprint image included in the first fingerprint area as the second fingerprint area.

Afterwards, the processing unit 120 may determine whether there is a change in brightness in the extracted second fingerprint area at S308.

When it is not determined that there was a change in brightness in the second fingerprint area as a result of determining whether there was a change in brightness therein, that is, when it is determined that the number of effective areas where there was a change in brightness in the second fingerprint area is zero at S310, the processing unit 120 may measure the range of brightness values of the first fingerprint area at S312. For example, when the first fingerprint area is in the form of a 3×3 grid, the range of brightness values of the first fingerprint area in the nine areas of the grid may be measured.

On the other hand, when it is determined that there was a change in brightness in the second fingerprint area as a result of determining whether there was a change in brightness therein, that is, when it is not determined that the number of effective areas where there was a change in brightness in the second fingerprint area is zero at S310, the processing unit 120 may measure the range of brightness values of the first fingerprint area and the second fingerprint area in the effective areas where there was a change in brightness at S314.

Thereafter, the processing unit 120 may determine the actual state of the fingerprint based on the result of measuring the range of the brightness values of the first fingerprint area at S316. For example, the processing unit 120 may classify the fingerprint as at least one of a normal fingerprint, a wet fingerprint, and a dry fingerprint based on the result of measuring the range of the brightness values of the first fingerprint area in the nine areas of the grid. For example, the processing unit 120 may classify the fingerprint as a normal fingerprint when a brightness value is within a threshold range, classify the fingerprint as a wet fingerprint when the brightness value falls outside the threshold range, and classify the fingerprint as a dry fingerprint when the brightness value falls below the threshold range.

In addition, the processing unit 120 may determine the actual state of the fingerprint based on the result of measuring the range of the brightness values of the first fingerprint area and the second fingerprint area at S316. For example, the processing unit 120 may classify the fingerprint as at least one of a normal fingerprint, a wet fingerprint, and a dry fingerprint based on both of the result of measuring the range of the brightness values of the first fingerprint area in the nine areas of the grid and the result of measuring the range of the brightness values of the second fingerprint area based on the first fingerprint area. For example, the processing unit 120 may classify the fingerprint as a normal fingerprint when a measured brightness value is within a threshold range, classify the fingerprint as a wet fingerprint when the brightness value falls outside the threshold range, and classify the fingerprint as a dry fingerprint when the brightness value falls below the threshold range.

FIGS. 9A to 9D are views for illustrating images obtained to determine a counterfeit fingerprint according to an embodiment of the present disclosure, and is a view for illustrating the characteristics of images of counterfeit fingerprints obtained by using counterfeit samples.

Figure 9A:
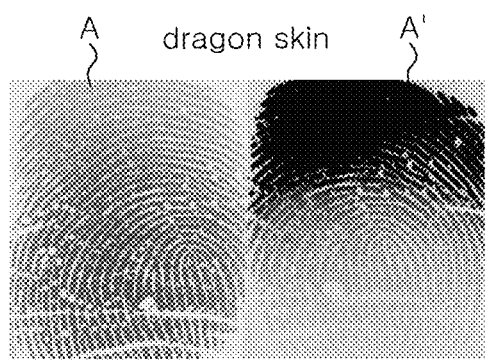
FIGS. 9A to 9D are views for illustrating images obtained to determine a counterfeit fingerprint according to an embodiment of the present disclosure, and is a view for illustrating the characteristics of images of counterfeit fingerprints obtained by using counterfeit samples.
Figure 9B:
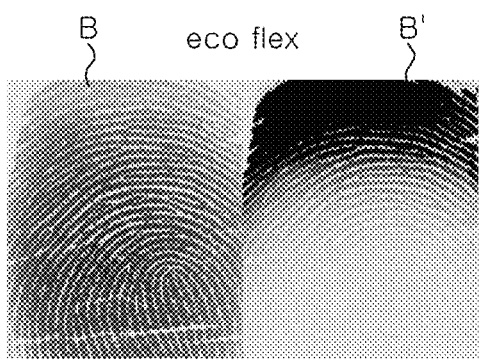
Figure 9C:
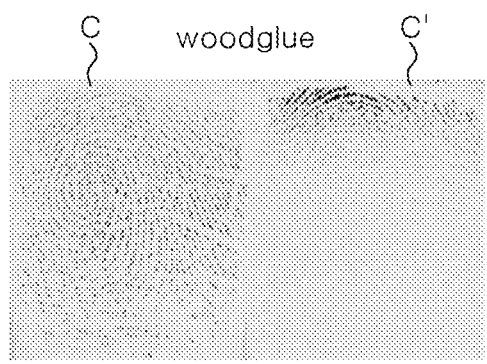
Figure 9D:
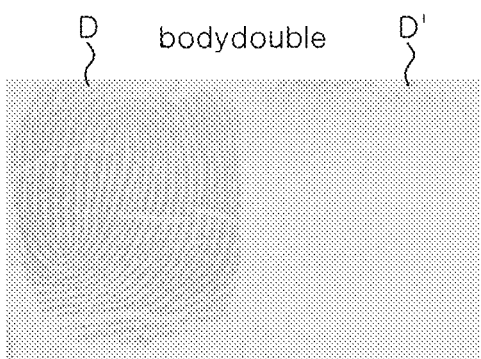

As shown in FIGS. 9A to 9D, information on the characteristics of the images of the counterfeit fingerprints obtained by using the counterfeit samples may include information on the characteristics of at least one of an image of a fingerprint obtained by using dragon skin as a counterfeit sample (FIG. 9A), an image of a fingerprint obtained by using eco flex as a counterfeit sample (FIG. 9B), an image of a fingerprint obtained by using wood glue as a counterfeit sample (FIG. 9C), and an image of a fingerprint obtained by using body-double as a counterfeit sample (FIG. 9D). In addition, the images of the counterfeit fingerprints (FIGS. 9A to 9D) may include the images (A to D) obtained by the internal light source 10 and the images (A' to D') obtained by the external light source 20, respectively.

According to an embodiment of the present disclosure, the accuracy in determining counterfeit fingerprints may be higher when both of the image obtained by the internal light source 10 and the image obtained by the external light source 20 are used for training than when only either the image obtained by the internal light source 10 or the image obtained by the external light source 20 is used for training.

Figure 10A:
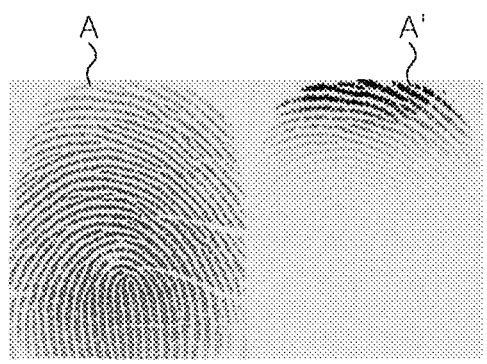
FIGS. 10A to 10C are views for illustrating images obtained to determine counterfeit fingerprints according to an embodiment of the present disclosure, and is a view for illustrating the characteristics of actual images of each type of fingerprints.
Figure 10B:
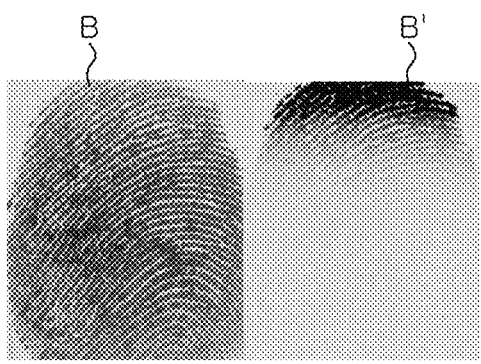
Figure 10C:
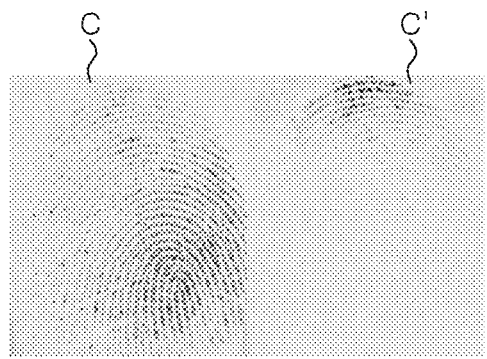

FIGS. 10A to 10C are views for illustrating images obtained to determine counterfeit fingerprints according to an embodiment of the present disclosure, and is a view for illustrating the characteristics of actual images of each type of fingerprints.

As shown in FIGS. 10A to 10C, for example, the actual images of each type of fingerprints may include at least one of a normal fingerprint image (FIG. 10A), a wet fingerprint image (FIG. 10B), and a dry fingerprint image (FIG. 10C), and the actual images of each type of fingerprints (FIGS. 10A to 10C) may include the images (A to C) obtained by the internal light source 10 and the images (A' to C') obtained by the external light source 20, respectively.

According to an embodiment of the present disclosure, the accuracy in determining counterfeit fingerprints may be higher when both of the image obtained by the internal light source 10 and the image obtained by the external light source 20 are used for training than when only either the image obtained by the internal light source 10 or the image obtained by the external light source 20 is used for training.

According to the above-described embodiments of the present disclosure, to provide a result of determining whether a fingerprint is forged, based on a fingerprint image obtained from the internal light source, the area of a fingerprint image obtained from the external light source may be extracted, and artificial intelligence may be trained about the extracted area. As a result, the accuracy in recognizing fingerprints and the reliability in determining counterfeit fingerprints may be increased, thereby ensuring high security in recognizing counterfeit fingerprints.

Although the embodiments of the present disclosure have been described above with reference to the accompanying drawings, those of ordinary skill in the art to which the present disclosure pertains will understand that the present disclosure can be implemented in other specific forms without changing the technical spirit or essential features thereof. For example, although a person skilled in the art may change the material, size, etc. of each element depending on the field of application, or combine or substitute embodiments to implement it in a form not clearly disclosed in the embodiments of the present disclosure, this also does not depart from the scope of the present disclosure. Therefore, the above-described embodiments are illustrative in all respects and should not be understood as limiting, and it should be said that these modified embodiments are included in the technical idea described in the claims of the present disclosure.

What is claimed is:

1. A device for determining a counterfeit fingerprint of a system that includes an internal light source and an external light source, the device comprising:
    an input unit to receive a first fingerprint image obtained from a light signal of the internal light source and a second fingerprint image obtained from the external light source when a target object's fingerprint comes in contact with a fingerprint contact surface of the system;
    a storage unit to store a command for outputting a result of the determining the counterfeit fingerprint using a pre-trained neural network; and
    a processing unit to extract a first fingerprint area of the first fingerprint image and a second fingerprint area of the second fingerprint image based on the first fingerprint area, to input the first fingerprint area and the second fingerprint area into the pre-trained neural network by executing the command to allow a result of the determining the counterfeit fingerprint to be output, to divide the first fingerprint image into a plurality of areas based on a light signal reflected from the internal light source to extract the first fingerprint area and extract the second fingerprint area within the first fingerprint area from a light signal transmitted from the external light source, to measure a range of brightness values of the first fingerprint area or the second fingerprint area, and to classify the target object's fingerprint as a normal fingerprint, a wet fingerprint, or a dry fingerprint based on the range of the brightness values.

2. The device of claim 1, wherein the pre-trained neural network uses the first fingerprint area and the second fingerprint area as data for training and uses information on characteristics of the target object's fingerprint as label data to output a result of the determining the counterfeit fingerprint.

3. The device of claim 1, wherein the second fingerprint area is extracted based on a distance between the external light source and the fingerprint contact surface.

4. The device of claim 1, wherein the target object's fingerprint is classified as the normal fingerprint when a brightness value of the target object's fingerprint is within a threshold range, as the wet fingerprint when the brightness value falls outside the threshold range, and as the dry fingerprint when the brightness value falls below the threshold range.

5. The device of claim 1, wherein the target object's fingerprint is classified as the normal fingerprint, the wet fingerprint, or the dry fingerprint based on a result of measuring the range of the brightness values of the first fingerprint area in the plurality of areas.

6. A method of determining a counterfeit fingerprint by a system for determining a counterfeit fingerprint that includes an internal light source and an external light source, comprising:
- extracting a first fingerprint area of a first fingerprint image obtained from a light signal of the internal light source when a target object's fingerprint comes in contact with a fingerprint contact surface of the system for determining a counterfeit fingerprint;
- extracting a second fingerprint area of a second fingerprint image obtained from a light signal of the external light source based on the first fingerprint area; and
- inputting the first fingerprint area and the second fingerprint area into a pre-trained neural network of the system for determining the counterfeit fingerprint,
- wherein the extracting of the first fingerprint area comprises extracting the first fingerprint area by dividing the first fingerprint image into a plurality of areas based on a light signal reflected from the internal light source, and
- wherein the extracting of the second fingerprint area comprises extracting the second fingerprint area within the first fingerprint area from a light signal transmitted from the external light source.

7. The method of claim 6, wherein the pre-trained neural network uses the first fingerprint area and the second fingerprint area as data for training and uses information about characteristics of the target object's fingerprint as label data to output a result of the determining the counterfeit fingerprint.

8. The method of claim 6, further comprising classifying the target object's fingerprint as a normal fingerprint, a wet fingerprint, or a dry fingerprint based on a range of brightness values of the first fingerprint area or the second fingerprint area.

9. The method of claim 8, wherein the classifying of the target object's fingerprint comprises classifying the target object's fingerprint as the dry fingerprint when a brightness value of the target object's fingerprint falls below a threshold range, classifying the target object's fingerprint as the wet fingerprint when the brightness value falls outside the threshold range, and classifying the target object's fingerprint as the normal fingerprint when the brightness value is within the threshold range.

10. The method of claim 8, wherein the pre-trained neural network uses the first fingerprint area and the second fingerprint area as data for training and uses information on characteristics of the normal fingerprint, the wet fingerprint, or the dry fingerprint as label data to output a result of the determining the counterfeit fingerprint.

11. A non-transitory computer-readable recording medium, comprising a set of instruction stored thereon, that when executed by a processor, perform a method of training a neutral network of a system for determining a counterfeit fingerprint, the method comprising:
- extracting a first fingerprint area of a first fingerprint image obtained from a light signal of an internal light source of the system when a target object's fingerprint comes in contact with a fingerprint contact surface of the system;
- extracting a second fingerprint area of a second fingerprint image obtained from a light signal of an external light source of the system based on the first fingerprint area; and
- training a neural network to output a result of the determining the counterfeit fingerprint by using the first fingerprint area and the second fingerprint area as data for training and using information about characteristics of the target object's fingerprint as label data,
- wherein the extracting of the first fingerprint area involves extracting the first fingerprint area by dividing the first fingerprint image into a plurality of areas based on a light signal reflected from the internal light source, and
- wherein the extracting of the second fingerprint area involves extracting the second fingerprint area within the first fingerprint area from a light signal transmitted from the external light source.

12. The non-transitory computer-readable recording medium of claim 11, wherein the extracting of the second fingerprint area further involves extracting the second fingerprint area based on a distance between the external light source and the fingerprint contact surface.

13. The non-transitory computer-readable recording medium of claim 11, further comprising classifying the target object's fingerprint as a normal fingerprint, a wet fingerprint, or a dry fingerprint based on a range of brightness values of the first fingerprint area or the second fingerprint area.

14. The non-transitory computer-readable recording medium of claim 13, wherein the training comprises training the neural network to output a result of the determining the counterfeit fingerprint by using the first fingerprint area and the second fingerprint area as data for training and using information about characteristics of the normal fingerprint, the wet fingerprint, or the dry fingerprint as label data.

* * * * *